Figures 1, 2:
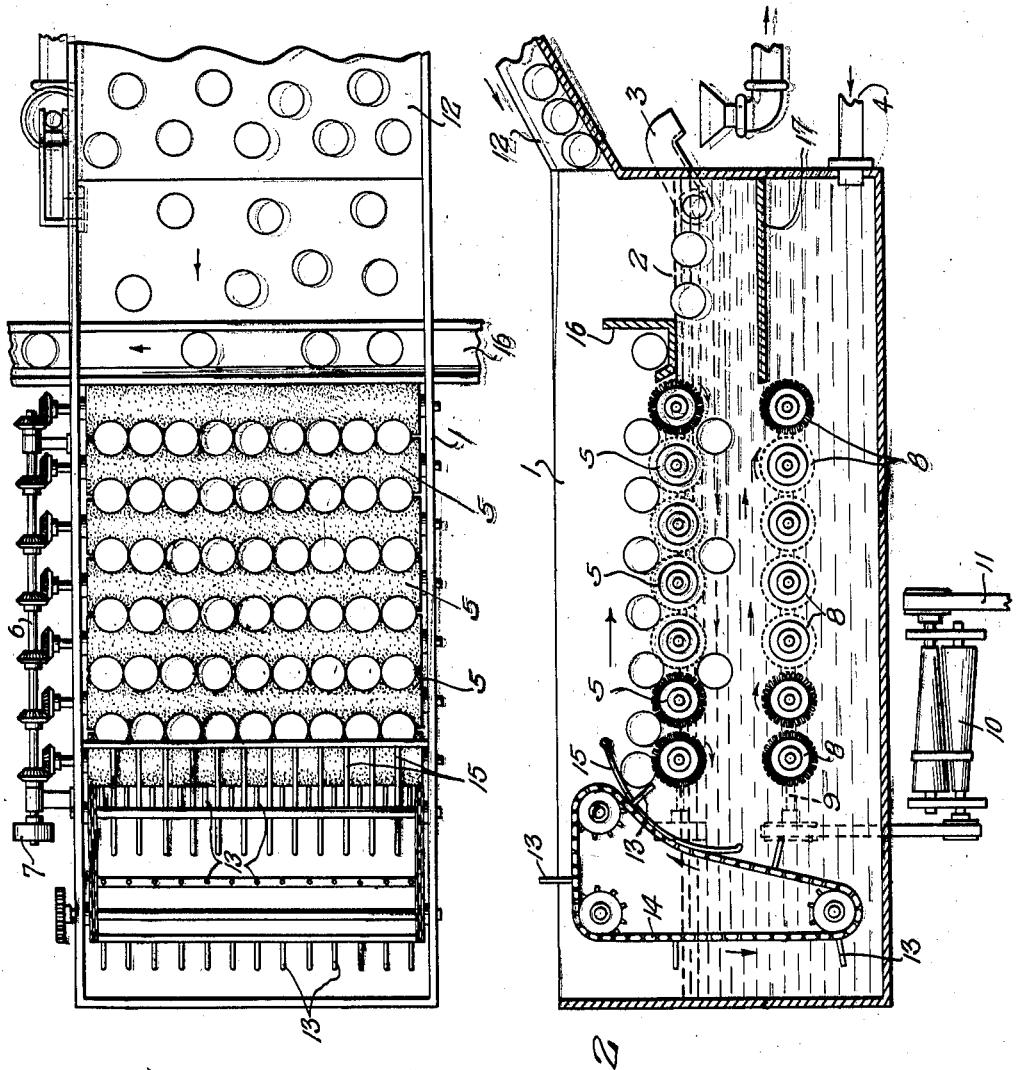

Sept. 18, 1934. A. R. THOMPSON 1,973,917
FRUIT CLEANING MACHINE
Filed Dec. 10, 1931

Inventor
Albert R. Thompson
By
Attorney

Patented Sept. 18, 1934

1,973,917

UNITED STATES PATENT OFFICE 1,973,917

FRUIT CLEANING MACHINE

Albert R. Thompson, San Jose, Calif., assignor to Food Machinery Corporation, San Jose, Calif., a corporation of Delaware Application December 10, 1931, Serial No. 580,204

23 Claims. (Cl. 146—202)

This invention relates to a method and apparatus for treating fruit or the like by means of immersion in a cleaning solution as well as by means of brushing or abrasive action and is particularly adapted to the treatment of oranges, grapefruit, limes and fruits of this nature.

It also relates to that type of fruit cleaning or brushing machines wherein the fruit is caused to move transverse to the axis of cleaning brushes and the speed of movement thereacross is determined somewhat by the volume of fruit supplied to the machine.

In machines where the cleaning brushes are mounted to dip into the cleaning solution and the fruit is supplied at one end of the machine and dumped into the solution and is caused to traverse the under sides of the rotating brushes by means of the currents set up in the solution adjacent the brushes it has been found that the flow streams so set up tend at times to cause a too rapid movement of the fruit along the immersed surfaces of the brushes with the result that proper cleaning is not effected and the rotation of the brushes have a tendency to bounce the fruit away from the brushes which also interferes with proper brushing of the fruit surfaces.

Retarding devices of various sorts have been tried comprising fixed members for gently contacting with the moving fruit; endless conveyor types of retarders with fixed flights for also contacting with the moving fruit to retard its movement but these devices, and especially the latter has had a tendency to crowd the fruit against the brushes at times and cause undue squeezing and mashing so that this device has not been fully satisfactory in practice.

In this invention a method and apparatus has been developed for creating a counter stream flow in the body of solution which has the effect of retarding the movement of the fruit along the under surface of the immersed brushes, and by providing means for regulating the extent of this counter stream flow the movement of the fruit may be regulated to a nicety with no possible danger of damaging the fruit in the slightest.

The fruit is normally held against the under sides of the rotating brushes by its buoyancy in the solution and if the fruit is not permitted to traverse the brushes at too fast a speed, or in other words if it is restrained from following the stream flow set up in the solution by the brushes and is held back in some gentle manner so that it cannot be damaged thereby, it can be given as long a treatment while immersed as may be desired.

The manner of retarding the fruit in this invention consists in immersing in the solution, an extra set of brushes, rolls or paddles or any device that will, by rotation or movement in some manner, set up a counter stream flow which will have the effect of retarding the speed of the stream flow set up by the cleaning brushes. Then by regulating the speed of the counter currents set up by the retarding devices any degree of retardation may be produced to get the desired results.

It is therefore a principal object of the invention to provide a device for treating fruits or the like wherein the fruit will be immersed in a cleansing solution and subjected to a scrubbing action while contacting with brushing or cleaning means.

It is also an object of the invention to provide a device for treating fruits or the like wherein the fruit is immersed in a treating solution and is moved transversely across cleaning means through the medium of flow streams set up in the solution.

It is also an object of the invention to provide a method and apparatus wherein fruit is caused to be immersed in a cleaning solution and is moved across the surfaces of cleaning means through the medium of flow streams set up in the solution and is controlled in such movement by means of a retarding device also immersed in the solution.

It is a further object of the invention to provide a fruit treating apparatus and method wherein the speed of movement of fruit through a cleaning solution is regulated by the creation of counter flow streams in said solution, with means for regulating the extent of said counter flow streams.

It is also an object of the invention to provide a fruit cleaning machine having a solution tank, a series of brushing rolls immersed in solution in said tank, and movable means located in said solution adjacent said rolls to create counter currents in said solution to control the movement of fruit therethrough.

It is also an object of the invention to provide a fruit cleaning machine wherein fruit is first immersed in a cleaning solution and caused to contact with cleaning means while immersed therein, the cleaning means causing a flow stream in said solution to move the fruit therethrough, and with other means in said solution to cause counter flow streams in said solution to retard and control the movement of the fruit therethrough, then to remove the fruit from said solution and place it on top of the same cleaning means for further treatment while out of the solution.

It is also an object of the invention to provide a fruit cleaning method and apparatus wherein fruit is placed in a solution and is caused to move in contact with cleaning means also immersed in said solution by means of currents set up in said solution by the movement of said cleaning means, and controlling or retarding the movement of the fruit by means of counter currents set up in the solution by moving means and then to transfer the fruit from the solution to cleaning means outside of the solution for further treatment and wherein the movement of fruit along said means is controlled by the volume of fruit passed through the apparatus.

With such objects in view as well as other advantages that may be inherent in the invention, consisting in the parts and combinations hereinafter set forth and claimed, it is understood that the several necessary parts and combinations constituting the same may be varied in their proportions, placement and general arrangement without departing from the scope and nature of the invention, and in order to make the invention more clearly understood there are shown in the accompanying drawing means and mechanism, somewhat diagrammatically, for placing the same in concrete form, without limiting the improvement in their application to the particular construction chosen to illustrate the invention.

In the drawing Figure 1 represents a plan view of an apparatus embodying the invention.

Figure 2 is a longitudinal sectional elevation of the apparatus and clearly shows the various operative elements.

The apparatus embodying this invention comprises a tank 1, carrying a body of solution 2, the level of which is controlled by the tiltable overflow device 3, with an inlet pipe 4 for conducting solution into the tank from any suitable source not shown. The volume of solution delivered to the tank may be sufficient to maintain the solution in a comparatively clean condition since much of the residue washed and scrubbed from the fruit will float away through the overflow pipe 3.

Arranged in the tank are a series of scrubbing and cleaning brushes 5 mounted in suitable bearings in the sides of the tank and all geared to a common drive shaft 6 which receives rotary movement through the pulley 7 from a suitable source of power not shown.

Located directly below the brushes 5 are an additional set of brushes 8 also finding bearing in the sides of the tank and all geared to a common drive shaft 9 in the same manner as is shown for the shaft 6. This shaft 9 receives rotary motion from a variable speed device 10 through the medium of which the speed of rotation of the brushes 8 may be varied to suit any operating conditions. The variable speed device derives its motion from a suitable source of power, not shown, through the belt 11.

The feed end of the machine is at 12 where the fruit is passed into the solution and is gradually moved along the under sides of the brushes 5 where it receives a scrubbing and cleaning during its passage.

When the fruit reaches the end of its travel under the brushes it is picked up by the flights 13 on the continuously moving chain 14, and due to the deflection bar 15 which gives a slight bend to the chain the flights tip slightly and tend to deliver the fruit in a gentle manner to the top of the first brush 5.

In machines of this type the movement of the fruit across the tops of the brushes 5 is accomplished entirely by the volume of fruit delivered to the brushes. The speeds of the brushes are so timed that the fruit lying in a trough between two brushes will remain in that trough until more fruit is added to the trough, which oncoming fruit has the effect of adding traction to the fruit in the trough and it will climb up and over the brush into the next trough, where it displaces fruit in this trough which climbs its brush and moves into the next trough. This action is repeated as long as new fruit is added to the accumulation in the first trough between the first two brushes in the series. The several troughs formed by adjacent brushes are always full of fruit when the machine is in active operation, so that the addition of more fruit to a filled trough will displace the same amount of fruit in the trough as has been added to that trough, and since the stream of oncoming fruit is continuous, the displacement is continuous, and the delivery of fruit to the discharge trough 16 is continuous and in the same volume as the fruit entering the machine.

Practically all fruits handled by a machine of this type are buoyant in the cleansing solution and therefore have a natural tendency to contact with the under sides of the brushes 5 in the passage thereunder.

The fruit falling into the solution from the feed trough 12 is prevented from getting under the brushes 8 by the baffle plate 17.

Operation

Fruit being delivered to the solution by the feed chute 12 is caused to move through the solution by a stream flow set up in the solution by the rotation of the brushes 5 which are more or less immersed in the solution according to the adjustment of the overflow device 3. The flow stream set up by the rotation of the brushes 5 is indicated by the arrows directly under these brushes and indicate that the flow is toward the left end of the tank. The buoyancy of the fruit tends to hold it against the brushes, but it has been found that the buoyancy varies with the different fruit in the same batch and that the movement of the brushes has a tendency to bob the fruit around in the solution so that its actual contact with the brushes is sometimes not sufficient to give it the proper cleaning and it has been found necessary to provide some kind of retarding means to slow up the movement of the fruit without slowing up the speed of the brushes. This retarding effect is accomplished through the medium of an auxiliary set of brushes located somewhat below the brushes 5 and having their top surfaces moving in the opposite direction to the bottom surfaces of the brushes 5. This contrary movement sets up a flow stream in the solution that is opposite to the flow stream set up by the brushes 5.

These two flow streams being in opposition in a mobile solution and immediately adjacent have the effect of slowing each other's movement and this slowing may be regulated to a fine degree by means of the variable speed transmission device 10. The effect of slowing or controlling the speed of the flow streams by this means has the effect of preventing undue agitation of the fruit as it contacts with the under sides of the brushes 5 and since its movement is thereby retarded it will receive a much longer treatment while in the solution.

The brushes 8 are shown some distance below the brushes 5. This location may be adjusted in the construction of the machine to suit the kind of fruit to be treated, if adjustment is found to be necessary. The fact that the speed of the brushes 8 may be regulated so as to control the retarding effect on the flow streams may obviate the necessity of adjusting the location of the brushes 8 relative to the brushes 5.

While applicant has shown rotating brushes as the medium for retarding the speeds of the flow stream set up by the brushes 5 he wishes to point out that this effect may be accomplished by other means than brushes or rollers, and that the direction of movement of any device adapted to produce this result may be other than that produced by the brushes shown and that his invention is intended to cover any and all such devices that produce a retarding effect in the flow stream in the solution.

What I claim as new and desire to secure by Letters Patent is:

1. An apparatus for treating fruit or the like comprising a solution tank, rollers in said tank forming a combined brushing and conveying means, means for controlling a level of liquid in said tank whereby said rollers may immerse therein, means for rotating said rollers, means for delivering fruit or the like to solution in said tank, means for directing the said fruit to the under sides of the said immersed rollers, the rotation of said rollers in said solution creating a current therein to carry the fruit along the under sides of said rollers, with rotary means adjacent said rollers for controlling the circulation set up by said rollers rotating in said solution to thereby control the movement of the immersed fruit but being out of normal contact with the immersed fruit.

2. An apparatus for treating fruit or the like comprising a solution tank, brush rollers in said tank forming a combined brushing and conveying means, means for delivering fruit or the like to solution in said tank, means for rotating said rollers in said solution thereby creating a circulation of solution in said tank tending to move said fruit along the under side of said rollers in the direction of the flow of solution, rotary means below said rollers for creating a countercurrent in said solution to retard the movement of fruit therethrough but being out of normal contact with said fruit.

3. An apparatus for treating fruit or the like comprising a solution tank, rollers immersed therein, means for rotating said rollers, means for directing fruit to the under side of said rollers whereby it is moved through said solution by the rotation of said rollers, movable means in said solution for creating a countercurrent in said solution to retard the movement of fruit therethrough but being out of normal contact with the said fruit, with means for elevating fruit from said solution.

4. An apparatus for treating fruit or the like comprising a tank, means for directing solution into said tank, means for varying the level of solution in said tank, means for directing fruit into said solution, rollers mounted to dip into said solution, means for rotating said rollers to create a current flow in said solution to move the fruit therethrough, rotary means in said solution to create a counter current flow in said solution and thereby control the movement of fruit through said solution, said rotary means being out of normal contact with said fruit.

5. An apparatus for treating fruit or the like comprising a tank, means for directing solution in said tank, means for controlling the level of solution in said tank, rollers mounted to dip into the solution in said tank to create a flow of solution in said tank, rollers completely immersed in the said solution, means to rotate said wholly immersed rollers to create a counter current of solution in said tank, means for directing fruit or the like to the solution in said tank whereby said fruit will move with one of said created flow streams therein and have its forward movement controlled thereby.

6. An apparatus for treating fruit or the like comprising a body of solution in a tank, movable means mounted in said solution to create a flow of solution in said tank and treat the fruit, other movable means mounted in said solution to create a counter flow of solution in said tank but being normally out of contact with the fruit, means for directing fruit to said solution whereby one of said flow streams will move said fruit therethrough and the other of said flow streams will retard the movement of said fruit thereby controlling the time of its immersion.

7. An apparatus for treating fruit or the like comprising a means for containing a body of solution, continuously moving means in said solution to create a flow stream therein, independently driven continuously moving means in said solution to create a counter flow stream therein, means for directing fruit or the like to said solution into one of said flow streams, the other of said flow streams acting as a retardent to the movement of said fruit through said solution.

8. An apparatus for treating fruit or the like comprising a means for containing a body of treating solution, continuously moving means in said solution to create a flow stream therein, independently driven continuously moving means in said solution to create a counter flow stream therein, means for directing fruit or the like to said solution onto one of said flow streams, the other of said flow streams acting as a retardent to the movement of fruit through said solution, with means for varying the movement of one of said continuously moving means.

9. An apparatus for brushing fruit or the like in the presence of a liquid, a series of brushing rollers arranged in parallel relation to form combined brushing and conveying means, a liquid contacting with said rollers, and adapted to support fruit or the like thereagainst, a series of devices adjacent said brushing rollers contacting with said liquid but normally out of contact with said fruit with means for imparting variable movement thereto, which movement tends to retard the movement of said fruit in said liquid, means for directing fruit or the like to said liquid and means for removing said fruit from said liquid.

10. An apparatus for brushing fruit or the like comprising a solution tank, means for maintaining a constant level of solution in said tank, brushing rollers mounted to dip into the solution in said tank, means for directing fruit into said solution to be treated by the under side of said brushes, means for elevating fruit from said tank and delivering it to the top side of said brushes for further treatment, means wholly immersed in the solution in said tank but out of normal contact with fruit therein for creating an agitation of said solution to retard or control the movement of fruit in said solution.

11. An apparatus for brushing fruit or the like comprising a solution tank, means for maintaining a level in said tank, brushing rollers mounted across said tank and dipping into said solution, other rollers mounted across said tank and wholly immersed in said solution, means for directing fruit to said solution, means for moving said rollers to cause said fruit to pass through said solution between the said two sets of rollers, said solution holding said fruit in contact with one of said sets of rollers and out of normal contact with said other set of rollers, with means for elevating fruit out of said solution and delivering it to said first mentioned set of rollers whereby it receives further treatment and is moved opposite to its direction when in the solution.

12. An apparatus for treating fruit or the like comprising a solution tank, treating means in said solution to contact with fruit therein and move it through said solution, means immersed in said solution and independently moved for controlling the movement of fruit in said solution while in contact with said treating means, said controlling means being normally out of contact with said fruit, with means for varying the effect of said controlling means.

13. An apparatus for brushing fruit or the like comprising a tank for a body of treating solution, means mounted to dip into said solution, means wholly immersed in said solution with a space between said two means, means for directing fruit to said space wherein it is supported by said solution in contact with said first means, means for moving both of said means to create a movement in said solution, the movement of said first means acting to move said fruit through said solution and the movement of said second means acting to retard the movement of fruit through said solution, with means for varying the movement of said second means to thereby vary the movement of fruit through said space.

14. An apparatus for treating fruit comprising a tank of solution, brushing rollers dipping into said solution, means for rotating said rollers, means for directing fruit to the under side of said brushing rollers whereby it is wholly immersed in said solution and is held against the under sides of said rollers by said solution, a complimentary set of rollers wholly immersed in said solution and positioned directly under said first set of rollers, means for rotating said wholly immersed rollers in the same direction as the said upper set of rollers but out of contact with said fruit, the movement of said sets of rollers in said solution creating counter currents therein whereby the movement of fruit therethrough is controlled.

15. An apparatus for treating fruit or the like comprising a series of brushing rollers arranged in parallel relation, the lower sides of said rollers dipping into a liquid, means for directing fruit to the undersides of said rollers and immersed in said liquid, means for elevating fruit from said liquid and delivering it to the upper sides of said rollers whereby fruit is moved transverse to the axis of said rollers through the urge of oncoming fruit, controlling means under the said rollers immersed in said liquid with means for giving a variable movement to said controlling means to thereby control the speed of fruit moving across the undersides of said brushing rollers.

16. An apparatus for brushing oranges or the like comprising a tank of liquid, means for directing liquid to said tank, means for maintaining a level of liquid in said tank, brush rolls positioned in parallel relation across said tank and dipping into the solution therein, other rolls positioned in parallel relation across said tank but on a lower level than said first rolls with a space between said two sets of rolls, means for directing oranges to said space between said rolls, means for rotating said rolls at the same or at different speeds, the rotating of said sets of rolls causing said fruit to move through the space therebetween at varying speeds depending on the varying of the speeds of said rolls, means for removing the oranges from said solution and depositing them onto the top surfaces of the upper set of rolls where they are caused to move transverse thereof by means of the urge of oncoming fruit.

17. An apparatus for treating fruit or the like comprising a tank for a body of solution, fruit treating means immersed in said solution, means for moving said treating means, means for placing fruit into said solution so as to contact with said treating means, the movement of said treating means in said solution producing a carrier flow stream which tends to move the fruit immersed therein in the direction of flow, other moving means in said solution for producing a flow stream counter to said carrier stream, the two oppositely moving streams acting to retard the movement of the fruit and thereby vary its time of immersion in the said solution.

18. An apparatus for treating fruit or the like comprising a tank for a body of solution, fruit treating means immersed in said solution, means for imparting rotary movement to said fruit treating means, means for directing fruit into said solution so it will pass underneath said treating means and contact therewith, the movement of said treating means acting to produce a carrier flow stream in said solution to move said immersed fruit along under said treating means, other rotary means immersed in said solution for creating another flow stream therein, said second flow stream causing a retardent effect of the carrier flow stream which in turn varies the speed of movement of said carrier flow stream and controls the time of immersion of said fruit in the solution.

19. An apparatus for treating fruit or the like comprising a tank for a body of solution, fruit treating means immersed in said solution, means for imparting rotary movement to said treating means, means for directing fruit into said solution so it will pass underneath said treating means and in contact therewith, the movement of said treating means acting to produce a carrier flow stream in said solution to move the immersed fruit along under said treating means, other movable means immersed in said solution for producing a second flow stream therein to cause a retardent effect on the said carrier flow stream which in turn will vary the speed of movement of said flow stream and thereby vary the time the said fruit is immersed in said solution.

20. Same as claim 19 with this addition at the end: and means for varying the speed of movement of the second flow stream to thereby vary the retardent effect of said flow stream.

21. An apparatus for treating fruit or the like comprising a tank for treating solution, two sets of horizontally disposed rollers immersed in said solution, means for rotating one set of rollers counter to the other set, means for directing a stream of fruit between said two sets of rollers, the rotation of one set of rollers producing a carrier flow stream through said solution and the rotation of the other set acting to retard or accelerate the flow of said carrier stream according to rotative speed of the counter set of rollers and means for varying the rotative speed of said counter set of rollers.

22. A method of controlling the time of treatment of a quantity of fruit and the like consisting in the steps of providing a movable treating surface immersed in a liquid, the movement of said surface causing a current flow in said liquid, placing fruit into said liquid to contact with said treating surface and move with the current flow, providing another movable surface that is immersed in said liquid the movement thereof tending to set up a counter current flow to act as a retardent to the movement of fruit through the first mentioned current flow and thereby control the time the fruit is in contact with the said treating surface.

23. A method of controlling the time of treatment of a quantity of fruit and the like consisting in the steps of providing a movable treating surface immersed in a liquid, the movement of said surface causing a current flow in said liquid, placing fruit into said liquid to contact with said treating surface and move with the current flow, providing another movable surface that is immersed in said liquid the movement thereof tending to set up a counter current flow to act as a retardent to the movement of fruit through the first mentioned current flow and thereby control the time the fruit is in contact with the said treating surface, and to vary the extent of counter current flow to thereby vary the time of treatment.

ALBERT R. THOMPSON.